United States Patent [19]

Sudo

[11] Patent Number: 4,718,016
[45] Date of Patent: Jan. 5, 1988

[54] METHOD OF AND SYSTEM FOR CONTROLLING IDLING SPEED IN ELECTRONICALLY CONTROLLED ENGINE

[75] Inventor: Toshiaki Sudo, Toyota, Japan

[73] Assignee: Toyota Jidosha Kabushiki Kaisha, Toyota, Japan

[21] Appl. No.: 884,905

[22] Filed: Jul. 14, 1986

Related U.S. Application Data

[63] Continuation of Ser. No. 547,926, Nov. 2, 1983, abandoned.

[30] Foreign Application Priority Data

May 10, 1983 [JP] Japan .................................. 58-81288

[51] Int. Cl.[4] .............................................. F02D 33/00
[52] U.S. Cl. ........................... 364/431.07; 364/431.11; 123/339; 123/479
[58] Field of Search ....................... 364/431.10, 431.11, 364/431.07; 123/339, 479; 73/117.3, 119 A; 340/52 F, 52 R

[56] References Cited

U.S. PATENT DOCUMENTS

| | | | |
|---|---|---|---|
| 4,402,217 | 9/1983 | Higashiyama | 73/117.3 |
| 4,414,950 | 11/1983 | Otsuka et al. | 123/479 |
| 4,461,253 | 7/1984 | Kobashi et al. | 123/339 |
| 4,462,360 | 7/1984 | Kobayashi et al. | 123/339 |
| 4,475,503 | 10/1984 | Nakamura et al. | 123/339 |

FOREIGN PATENT DOCUMENTS

| | | | |
|---|---|---|---|
| 0148933 | 11/1980 | Japan | 123/339 |
| 0138436 | 10/1981 | Japan | 123/339 |
| 0062947 | 4/1982 | Japan | 123/339 |
| 0048752 | 3/1983 | Japan | 123/339 |

*Primary Examiner*—Parshotam S. Lall
*Attorney, Agent, or Firm*—Cushman, Darby & Cushman

[57] ABSTRACT

In a method of and system for controlling an idling speed in an electronically controlled engine, wherein the idling speed is feedback-controlled in accordance with the operating condition of the engine, an idling speed feedback process and an engine speed upper limit setting process are prohibited when a vehicle speed detecting system has failed, so that erroneous control of the idling speed can be prevented from occurring during running of a vehicle.

9 Claims, 8 Drawing Figures

METHOD OF AND SYSTEM FOR CONTROLLING IDLING SPEED IN ELECTRONICALLY CONTROLLED ENGINE

This is a continuation of application Ser. No. 547,926 filed Nov. 2, 1983, now abandoned.

BACKGROUND OF THE INVENTION

1. Field of the Invention

This invention relates to a method of and a system for controlling idling speed in an electronically controlled engine, and more particularly to improvements in controlling idling speed of an electronically controlled engine wherein idling speed is feedback controlled in accordance with the operating conditions of the engine. The invention is especially useful with an electronically controlled engine of a motor vehicle provided with an electronically controlled fuel injection system.

2. Description of the Prior Art

Recently, along with advancement in electronic control techniques, and particularly with the advent of digital control techniques, so-called electronically controlled engines have been put into practical widespread use. The air-fuel ratio of such an electronically controlled engine is controlled by means of an electronically controlled fuel injection device. In electronically controlled engines of this type, a fuel injection period is typically determined in accordance with engine intake air flow rate or engine intake pipe pressure and in accordance with engine speed. Fuel injector valves provided on the intake manifold of the engine inject fuel towards engine intake ports. These fuel injector valves are opened only for an electronically controlled fuel injection period, so that the air-fuel ratio of the engine may be accurately controlled. Such electronically controlled fuel injection devices have been widely used in engines for motor vehicles, in which air-fuel ratio must be precisely controlled to obtain acceptably low exhaust emissions.

In such an electronically controlled engine, air intake flow rate while the engine is idling (during which time the vehicle is generally stationary) is controlled by an electronic feedback control unit in accordance with a difference between the engine speed and a predetermined target idling speed. Thus, engine idling speed is controlled using feedback (closed-loop) control techniques. The electronic control unit controls air intake flow rate by controlling the degree to which an idling speed control valve ("ISCV") is open, this valve by-passing the throttle valve to provide air to the engine during idling and at other times.

The idling speed control described above makes it possible to accurately control the idling speed of the engine. However, when the vehicle speed detecting system (e.g. vehicle speed sensor) fails and no vehicle speed signals are inputted to the electronic control unit, the electronic control unit judges that the vehicle is stationary. Even though the vehicle may actually be moving, the electronic control unit causes the idling speed control valve ("ISCV") to close, thus causing the flow rate of air passing through the ISCV to decrease. This inappropriate control response may cause problems such as engine stalling during deceleration of the vehicle.

More specifically, under normal conditions (as shown graphically in FIG. 1), a feedback process for closing the ISCV to thereby cause engine speed to approach a predetermined target idling speed is effected only when the vehicle is stationary. When the vehicle is moving, the idling speed feedback control process is discontinued, so that satisfactory control of engine idling speed occurs even when the vehicle is stopped after traveling. In contrast, when the vehicle speed detecting system (the vehicle speed sensor, for example) fails, the electronic control unit judges that the vehicle is stopped even when the vehicle is moving. In consequence, when the vehicle begins to decelerate and the throttle valve is closed, the electronic control unit limits engine speed to an upper limit to prevent excessive rotations during a given period. The controller is "fooled" into determining that the engine is idling (from a time $t_1$ shown in FIG. 2), resulting in the closure of the ISCV. Since the feedback process for matching the engine speed to the target idling speed is performed continuously, the flow rate of intake air passing through the ISCV is further decreased from a time $t_2$ to a time $t_3$. In consequence, while the velocity of the vehicle and the engine speed is constant or increasing, no particular problems occur since intake air may flow into the engine by passing through the throttle valve. However, when the engine throttle valve closes to bring when the vehicle to a stop or to slow the vehicle, the flow rate of the engine intake air becomes considerably less than that required to operate the engine (since no air is being supplied through the now-closed ISCV), and the engine may falter and stall at a time $t_4$.

In order to obviate the above-described disadvantages of the prior art, it has been proposed to keep the engine speed above or equal to a preset lower limit when it is judged that the vehicle speed detecting system has failed. However, in some cases, such a proposal has proved to be ineffective depending upon the running condition.

SUMMARY OF THE INVENTION

An idling speed control method and system in accordance with the present invention are capable of reliably avoiding problems such as stalling of an electronically controlled engine regardless of running conditions even when a vehicle speed detecting system has failed. An object of the invention is to readily and reliably judge when the vehicle speed detecting system has failed. Another object of the present invention is to readily and reliably judge engine operating condition when the vehicle is moving. The method and system of the present invention are also capable of quickly and accurately judging failure of the vehicle speed detecting system. The present invention also provides an idling speed control system for an electronically controlled engine having an idling speed control valve capable of easily performing fine control. Yet another object of the present invention is to provide an idling speed control system for an electronically controlled engine having an electronic control unit with a simplified construction.

To achieve the objects and advantages discussed above, the idling speed of an electronically controlled engine is controlled using feedback in accordance with the engine operating conditions as shown in FIG. 3 by first judging whether the vehicle speed detecting system has failed, and if so, judging whether the failure of the vehicle speed detecting system has continued over a predetermined period of time. Feedback control of the idling speed and control of the engine speed upper limit setting are inhibited when the failure has continued over the predetermined period of time. The vehicle speed detecting system is judged to have failed whenever a vehicle speed obtained from an output of a vehicle speed sensor is zero and the vehicle is judged to be moving based upon the engine operating condition. Even though sensed vehicle speed is zero, the vehicle is judged to be in the running condition (i.e. moving) whenever the engine speed is above a first preset engine speed higher than a normal target idling speed and below a second preset engine speed higher than the first preset engine speed, and the intake air flow rate is above a preset intake air flow rate higher than the intake air flow during idling. The aforesaid predetermined period of time in the preferred embodiment is five seconds.

An idling speed control system for the electronically controlled engine in accordance with the present invention includes an air flow meter for detecting the flow rate of air taken in through the engine air cleaner and a throttle sensor having an idle switch for detecting whether the throttle valve is at a position corresponding to engine idle. A bypass passageway is provided which bypasses the throttle valve, and an idling speed control valve (ISCV) controls the opening area of the bypass passageway to thereby control the engine idle speed. Fuel injectors inject pressurized fuel toward intake ports of respective cylinders of the engine, while a crank angle sensor emits a crank angle signal in accordance with the rotation of the engine. A vehicle speed sensor detects vehicle running speed.

An electronic control unit determines a fuel injection period in accordance with at least the intake air flow rate and the engine speed obtained from the crank angle signal, and applies a valve opening period signal to the injectors. The control unit also controls the ISCV using feedback in accordance with a difference between the engine speed and the target idling speed during idling, and further, inhibits idling speed feedback control and engine upper limit setting control from being performed when failure of the vehicle speed detecting system continues over a predetermined period of time.

An ISCV in accordance with the present invention includes a valve body for changing the opening area of the bypass passageway, and a step motor. The step motor includes a shaft solidly secured to the valve body, a rotor threadably coupled to an intermediate portion of the shaft, a permanent magnet disposed around the rotor and a coil provided around the permanent magnet.

The electronic control unit of the present invention includes a central processing unit including a microprocessor for carrying out various operational processes and a read only memory for storing control programs and various data. A random access memory is also provided for temporarily storing operational data in the central processing unit. An analog-to-digital multiplexing converter converts analog signals produced at least by the air flow meter into digital signals and successively acquires these digital signals. An input/output port receives digital signals outputted at least from the idle switch of the throttle sensor, the crank angle sensor and the vehicle speed sensor, and outputs control signals at least to the ISCV and to the injectors in accordance with the results of processing performed by the central processing unit. A common bus is used to connect the aforesaid respective elements to one another.

According to the present invention, upon failure of the vehicle speed detecting system, idling speed feedback control and engine speed upper limit setting control are inhibited. Thus, the possibility of erroneous control of the idling speed is eliminated while the vehicle is moving even though the vehicle speed detecting system has failed, so that problems such as engine stall can be avoided.

BRIEF DESCRIPTION OF THE DRAWINGS

Additional features of the present invention, as well as other objects and advantages thereof, will become more readily apparent from consideration of the following detailed description taken in conjunction with the accompanying drawings, in which like reference numerals designate the same or similar parts throughout the drawings and wherein.

DETAILED DESCRIPTION OF THE PREFERRED EMBODIMENT

The following is a detailed description of the presently preferred exemplary embodiment of an intake air flow rate sensing type electronically controlled fuel injection system for an electronically controlled engine 10 of a motor vehicle in accordance with the present invention.

Figure 4:
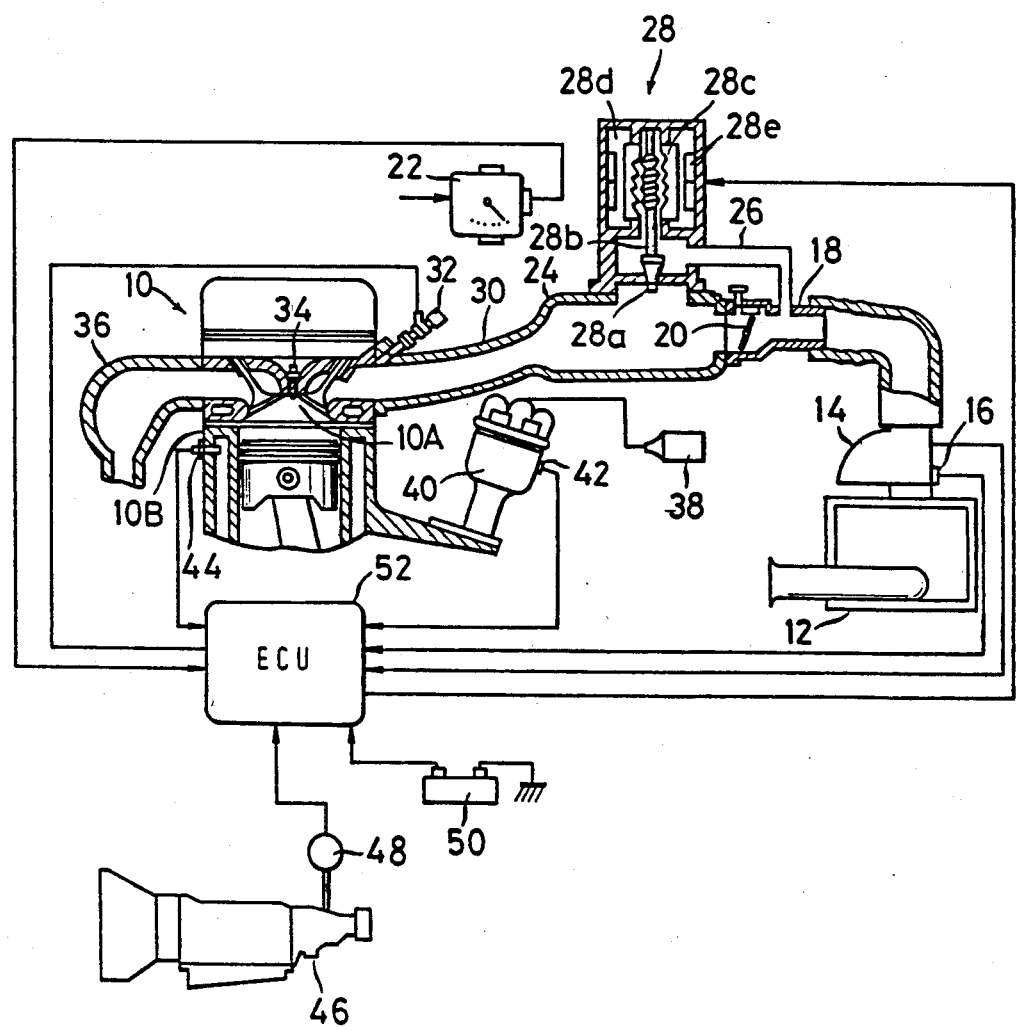
FIG. 4 is a sectional and schematic view of a preferred embodiment of an electronically controlled engine for a motor vehicle provided with an intake air flow rate sensing type electronically controlled fuel injection system and an electronic control unit in accordance with the present invention.
Figure 1:
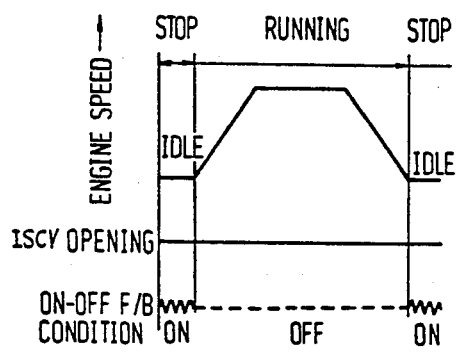
FIG. 1 is a graphical illustration of an example of the relationship between the engine speed, the opening of the ISCV and the on-off feedback condition of a conventional idling speed control method when the vehicle speed detecting system is operating normally.
Figure 2:
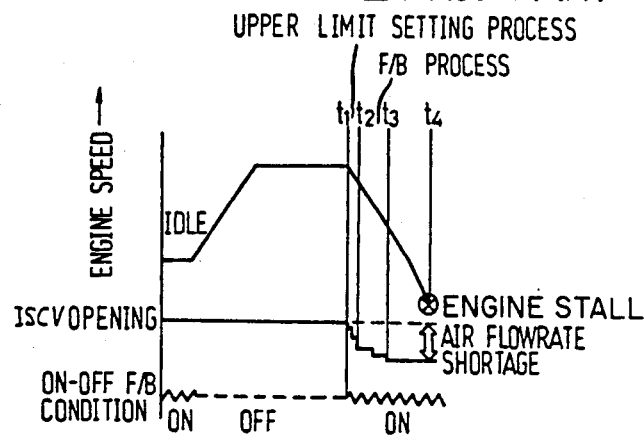
FIG. 2 is a graphical illustration of an example of the relationship between the engine speed, the opening of the ISCV and the on-off feedback condition when the vehicle speed detecting system has failed.
Figure 3:
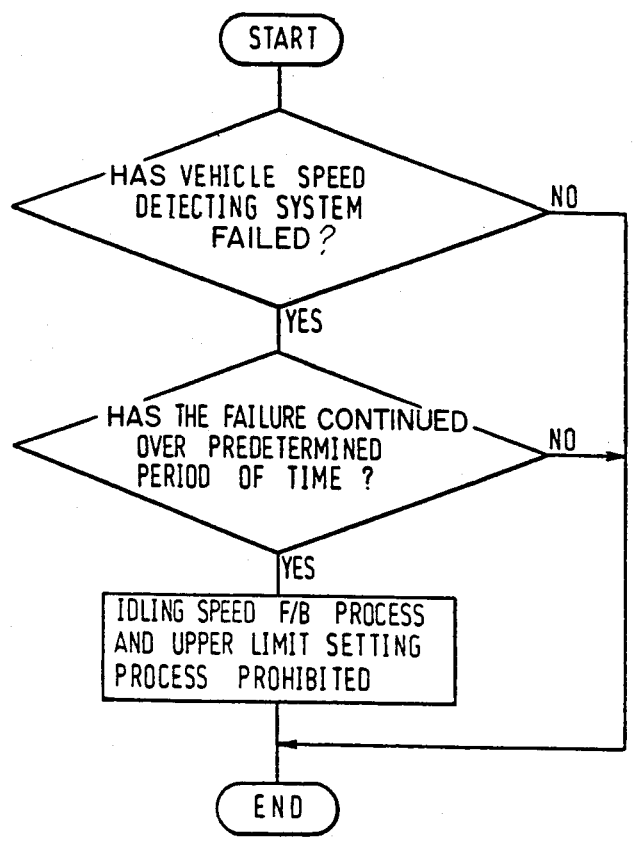
FIG. 3 is a high-level flow chart of the idling speed control method of the electronically controlled engine according to the present invention.

FIG. 4 is a schematic diagram of the presently preferred exemplary embodiment of the present invention. The preferred embodiment includes an air cleaner 12 for taking in outside air and an air flow meter 14 for detecting the flow rate of air taken in through the air cleaner 12. An intake air temperature sensor 16 incorporated in the air flow meter 14 detects the temperature of intake air. A throttle valve 20 is provided on a throttle body 18 and is adapted to be opened or closed in operational association with an accelerator pedal (not shown, provided in a driver's compartment). Throttle valve 20 controls the flow rate of engine intake air. A throttle sensor 22 has an idle switch which detects whether or not the position of the throttle valve corresponds to engine idle. A surge tank 24 prevents the interference of intake air, while a bypass passageway 26 bypasses the throttle valve 20 to permit air to reach surge tank 24 even when throttle valve 20 is completely closed.

An ISCV 28 (idling speed control valve) controls the opening area of the bypass passageway 26 to control engine idling speed and to provide air to the engine when throttle valve 20 is closed. Injectors 32, provided on an intake manifold 30, inject pressurized fuel toward intake ports of respective cylinders of engine 10. Spark plugs 34 ignite in air-fuel mixture introduced into combustion chambers 10A of the respective cylinders of the engine. An exhaust manifold 36 collects exhaust gas produced as a result of combustion within the exhaust chambers 10A of the engine 10 and exhausts the gas into an exhaust system (not shown). A distributor 40 having a distributor shaft which rotates along with the rotation of a crank shaft of the engine 10 distributes a secondary high voltage ignition signal (produced by an ignition coil 38) to the spark plugs 34 of the respective cylinders of engine 10.

A crank angle sensor 42 incorporated in the distributor 40 emits a crank angle signal in accordance with the rotation of the distributor shaft. A water temperature sensor 44 provided on cylinder block 10B of the engine 10 senses the temperature of engine coolant. A transmission 46 selects a suitable drive gear ratio in accordance with the running condition of the vehicle, and transmits rotational energy produced by engine 10 to the wheels (not shown) of the vehicle. A vehicle speed sensor 48 detects the velocity at which the vehicle is traveling (i.e. the running speed of the vehicle) from the rotational speed of an output shaft of the transmission 46. A battery 50 supplies electrical power to an electronic control unit 52 and to other circuits of the vehicle requiring electrical power.

An electronic control unit 52 (hereinafter referred to as the "ECU") determines the fuel injection period (i.e., the opening timing and duration of injector 32) in accordance with at least intake air flow rate output from the air flow meter 14 and engine speed obtained from a crank angle signal produced by the crank angle sensor 42. ECU 52 applies a valve opening period signal to the injectors 52 and controls the position of ISCV 28 using feedback in accordance with a difference between the engine speed and the target idling speed during engine idling.

As shown in detail in FIG. 4, ISCV 28 includes a valve body 28a which selectively changes the opening area of the bypass passageway 26, and a step motor. The step motor includes a shaft 28b solidly secured to valve body 28a, a rotor 28c threadably coupled to the intermediate portion of the shaft 28b, a permanent magnet 28d disposed around the rotor 28c, and a coil 28e provided around the permanent magnet 28d.

Figure 5:
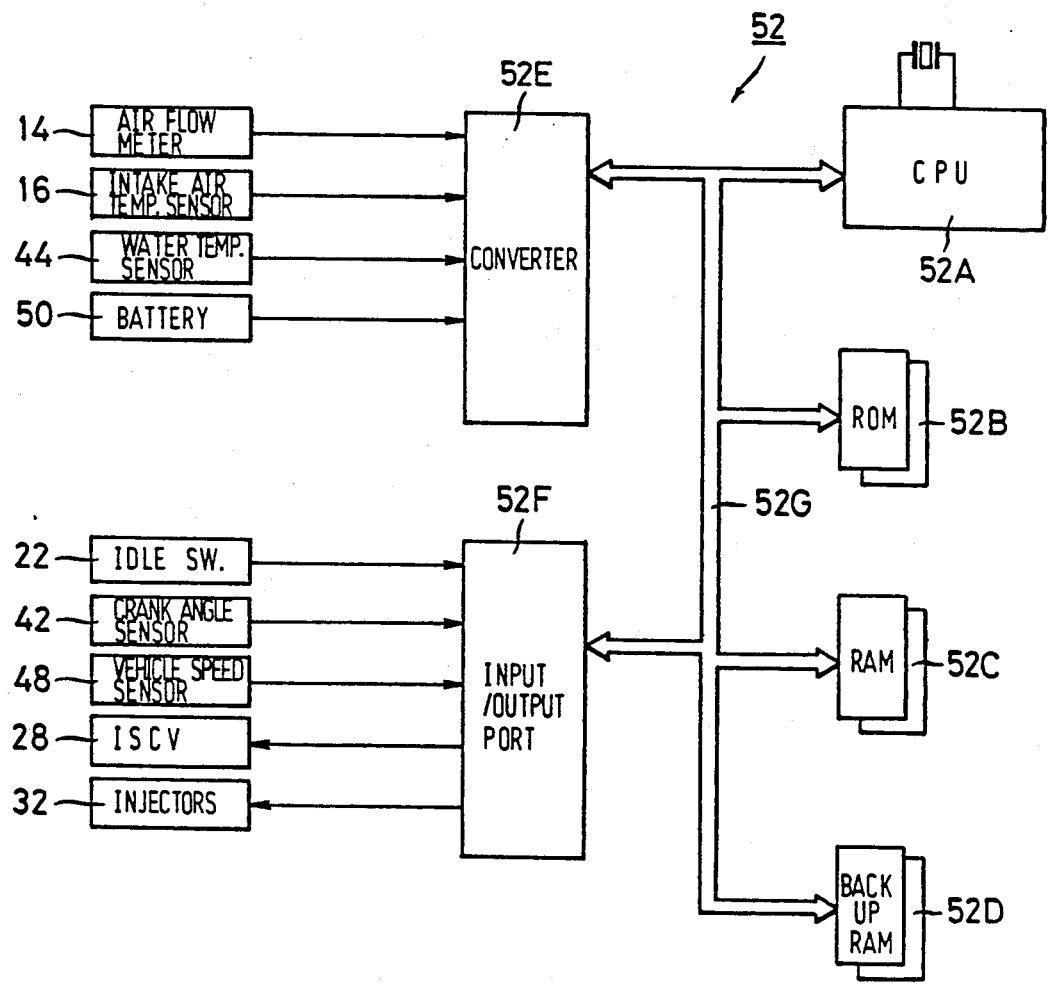
FIG. 5 is a block diagram of the electronic control unit shown in FIG. 4.

As shown in detail in FIG. 5, ECU 52 includes a central processing unit (hereinafter referred to as a "CPU") 52A (including a microprocessor, for example) which performs various operational processes. A read only memory (ROM) 52B stores control programs, various data and the like. A random access memory (RAM) 52C temporarily stores operational data and the like produced by CPU 52A. A backup non-volatile RAM 52D (supplied with power from an auxiliary power source) stores information even when the engine 10 is not running. An analog-to-digital (A/D) multiplexing converter 52E converts selected analog signals produced by air flow meter 14, the intake air sensor 16, the water temperature sensor 44, the battery 50 and the like into digital signals and successively acquires these digital signals and passes them along to CPU 52A. A multiplexing input/output (I/O) port 52F selects digital signals outputted from the idle switch of the throttle sensor 22, the crank angle sensor 42, the vehicle speed sensor 48 and the like and passes these input signals to CPU 52A. I/O port 52F also outputs control signals (applied to it by CPU 52A) to the ISCV 28, the injectors 32 and the like in accordance with the results of processes performed by CPU 52A. A common bus 52G connects the aforesaid respective elements to one another.

The operation of the preferred embodiment will now be described.

Figure 6:
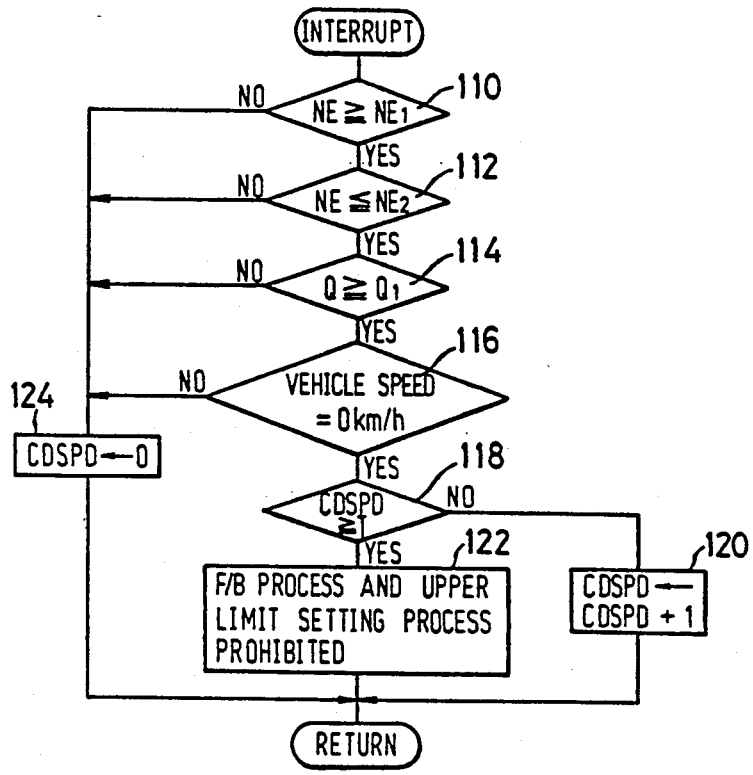
FIG. 6 is a flow chart of the routine performed by the embodiment shown in FIG. 4 for carrying out the fail-safe idling speed control process of the present invention.

The fail-safe process for idling speed control is carried out in accordance with a flow chart shown in FIG. 6. The process begins execution at step 110 every time a predetermined period of time elapses (CPU 52A is interrupt-driven by a periodic timing signal in a conventional manner). Decision block 110 determines whether present engine speed NE is above a first preset engine speed $NE_1$ higher than a normal target idling speed. If the result of the test performed by decision block 110 is true (i.e. $NE > NE_1$), the processing proceeds to step 112, where it is judged whether the present engine speed NE is below a second preset engine speed $NE_2$, where $NE_2$ is greater than $NE_1$. If the result of this test is positive (i.e. $NE < NE_2$), then the process proceeds to step 114. Step 114 determines whether present engine intake air flow rate Q (obtained from the output of air flow meter 14) is above a preset intake air flow rate $Q_1$ higher than the nominal intake air flow rate of the engine during idling.

Figure 7:
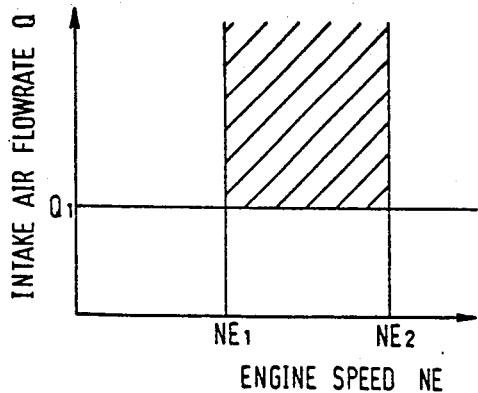
FIG. 7 is a graphical illustration of a failure judging region of the embodiment shown in FIG. 4.

When the engine speed NE is between $NE_1$ and $NE_2$ (i.e. $NE_1 < NE < NE_2$) and the intake flow rate Q is above $Q_1$ (i.e. $Q > Q_1$) as indicated by the oblique lines in FIG. 7, it is determined indirectly from these engine operating conditions that the vehicle is in motion, and step 116 is performed. Step 116 judges whether the vehicle speed obtained from the output of the vehicle speed sensor 48 is zero (km/h). If the result of the test performed by step 116 is positive (i.e., even though the vehicle is judged to be in motion in response to engine operating conditions, the vehicle speed obtained from the output of the vehicle speed sensor 48 is zero), the vehicle detecting system is determined to have failed.

If step 116 determines the speed detecting system has failed, step 118 is executed to judge whether a count value contained in a counter CDSPD (which counts the duration of the period the vehicle speed detecting system has failed) exceeds a predetermined value (this predetermined value corresponds to a predetermined period of time such as five seconds). Step 118 makes failure detection more exact. It is possible for the engine operating conditions to fall within the area of the graph shown in FIG. 7 while the vehicle is stopped, although there is little possibility that these operating conditions will last for a long period time unless the vehicle is moving (since it is very rare that an engine will be operated at any condition other than idle for very long while the vehicle is stopped). If the result of the test performed by step 118 is negative (i.e. the period during which the speed detecting system has been determined to be in failure does not exceed the predetermined period of time), step 120 is executed to increment the value stored in counter CDSPD and no further action is taken until the next interrupt occurs.

On the other hand, if the result of the test performed by step 118 is positive (i.e. it is judged that a failure in the vehicle speed detecting system has continued over the predetermined period of time), step 122 is executed to inhibit idling vehicle feedback control and engine speed upper limit setting control.

If the result of the test performed by any one of steps 110, 112, 114 and 116 is negative (i.e. it is not possible to judge that the vehicle speed detecting system has failed), step 124 is executed to clear counter CDSPD in preparation for a possible failure of the vehicle speed detecting system later.

Figure 8:
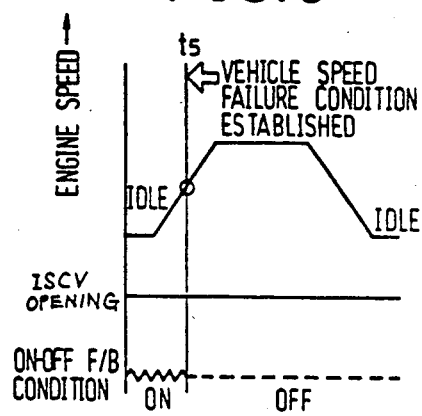
FIG. 8 is a graphical illustration of an example of the relationship between the engine speed, the opening of the ISCV and the on-off feedback condition of the embodiment shown in FIG. 4 when the vehicle speed detecting system fails while the vehicle is moving.

FIG. 8 shows one example of the relationship between the engine speed, the opening of the ISCV 28 and the on-off feedback condition in accordance with the preferred embodiment. As is apparent from the drawing, when conditions under which a failure of the vehicle speed detecting system is determined are established at a time $t_5$, the feedback control and the rotational speed upper limit setting control are inhibited immediately—the ISCV 28 is not closed, so that the flow rate of the air passing through the ISCV is not reduced, thus avoiding problems such as engine stalling when the vehicle is stopped or slowed after moving.

In the embodiment described above, the present invention is used to control an electronically controlled engine for a motor vehicle provided with an intake air flow rate sensing type electronically controlled fuel injection system. However, the scope of the present invention is not limited to this one application, but may be used with an electronically controlled engine for a motor vehicle provided with an intake pipe pressure sensing type electronically controlled fuel injection system, or with an ordinary electronically controlled engine provided with some other type of air-fuel ratio control device (such as a carburetor).

It will be apparent to those skilled in the art that the above-described embodiment is merely representative of the applications of the principles of the present invention. Numerous and varied other arrangements can be readily devised by those skilled in the art without departing from the spirit and scope of the invention.

What is claimed is:

1. In a system of the type including an internal combustion engine, means for converting rotational energy produced by said engine to movement of a vehicle, and means for automatically controlling said engine to idle at a predetermined idle speed whenever said vehicle is stationary, an improvement comprising:
    means for sensing the velocity of said vehicle;
    means for sensing at least one engine operating parameter including air sensing means for sensing the amount of air delivered to said engine and angular velocity sensing means for sensing the angular velocity of the rotational energy produced by said engine; and
    further automatic control means for inhibiting said automatic idle control means from operating whenever the velocity of said vehicle sensed by said velocity sensing means is zero and a vehicle moving condition is determined from the amount of air sensed by said air sensing means, said amouut of air exceeding a predetermined amount, and the angular velocity sensed by said angular velocity sensing means, said angular velocity falling within a predetermined range.

2. An improvement as in claim 1 wherein said further automatic control means includes means for timing the duration of the period said vehicle velocity sensing means senses said vehicle velocity is zero and said operating parameter sensing means senses said vehicle is moving, and inhibits said automatic idle control means from operating only if said timed duration exceeds a predetermined duration.

3. An improvement as in claim 1 wherein:
    said system further includes means for automatically limiting the angular velocity of the rotational energy produced by said engine when said velocity sensing means senses said vehicle velocity is zero; and
    said further control means also inhibits the operation of said limiting means whenever the velocity sensed by said vehicle velocity sensing means is zero and said engine operating parameter sensing means senses that said vehicle is moving.

4. In a system of the type including an internal combustion engine, means for converting rotational energy produced by said engine to the transmission of a vehicle, and means for automatically controlling said engine to idle at a predetermined idle speed whenever said vehicle is stationary, a method comprising the steps of:
    (1) sensing the velocity of said vehicle;
    (2) determining, in response to said sensing at step (1), whenever the velolity of said vehicle is zero;
    (3a) sensing the amount of air delivered to said engine;
    (3b) sensing the angular velocity of the rotational energy produced by said engine;
    (4) determining that said vehicle is moving whenever the amount of air sensed at step (3a) exceeds a predetermined amount and the angular velocity sensed at step (3b) falls within a predetermined range; and
    (5) inhibiting said automatic idle control means from operating whenever said determining step (2) determines that said vehicle velocity is zero and said determining step (4) determines that said vehicle is moving.

5. A method as in claim 4 wherein said inhibiting step (5) includes the steps of:
    timing the duration of the period during which said determining step (2) determines said vehicle velocity is zero and said determining step (4) determines said vehicle is moving; and
    inhibiting said automatic idle control means from operating only if said duration timed by said timing step exceeds a predetermined duration.

6. A method as in claim 4 wherein said method further includes the steps of:
    (a) automatically limiting the angular velocity of the rotational energy produced by said engine when said determining step (2) determines said vehicle velocity is zero; and
    (b) discontinuing said limiting step (a) when said determining step (2) determines said vehicle velocity is zero and said determining step (4) determines said vehicle is moving.

7. In a system for electronically controlling an internal combustion engine powering a vehicle, said system including feedback control means for controlling the idling speed of the engine to be consistent with a target idling speed determined by operating condition signals of the engine produced by engine operating condition detecting means, and vehicle speed detecting means for producing a vehicle speed signal indicating the speed said vehicle is moving, a method comprising the steps of:

(1a) detecting whether engine speed NE is above a first present engine speed $NE_1$ higher than a nominal idling speed and also below a second present engine speed $NE_2$ greater than said first preset engine speed $NE_1$ in response to said engine operating condition signals produced by said engine operating condition detecting means;

(1b) detecting whether intake air flow rate Q of the engine is above a preset intake air flow rate $Q_1$ higher than the nominal intake air flow rate of the engine during idling in response to said engine operating condition signals;

(1c) determining that the vehicle is in a running condition when both $NE_1 \leq NE \leq NE_2$ and $Q \geq Q_1$;

(2) detecting whether said vehicle speed indicated by said vehicle speed signal is zero;

(3) determining that said vehicle speed detecting means has failed when said detecting step (2) detects said vehicle speed is zero and step (1c) detects that the vehicle is in said running condition; and (4) inhibiting the operation of said idling speed feedback control means when said determining step (3) determines said vehicle speed detecting means has failed.

8. A method as in claim 7 further including the steps of:

limiting maximum engine speed to an upper limit; and selectively inhibiting said engine speed limiting step when said determining step (3) determines said vehicle speed detecting means has failed.

9. A method as in claim 7 wherein:

said method further includes the step (a) of timing the period during which said determining step (3) determines said vehicle speed detecting means has failed; and said inhibiting step (4) inhibits the operation of said idling speed feedback control means when said period timed by said timing step exceeds a predetermined perior of time.

* * * * *